UNITED STATES PATENT OFFICE.

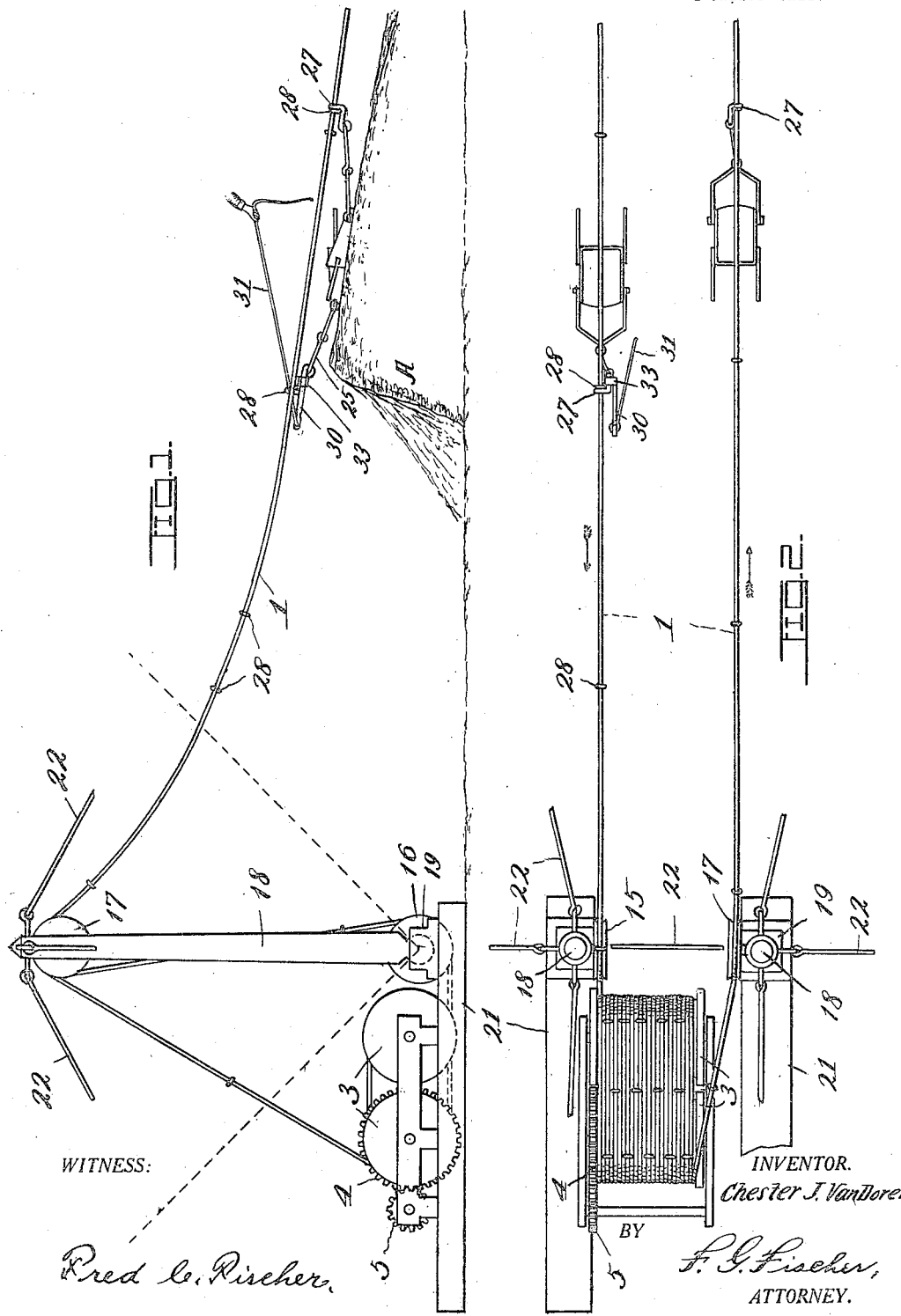

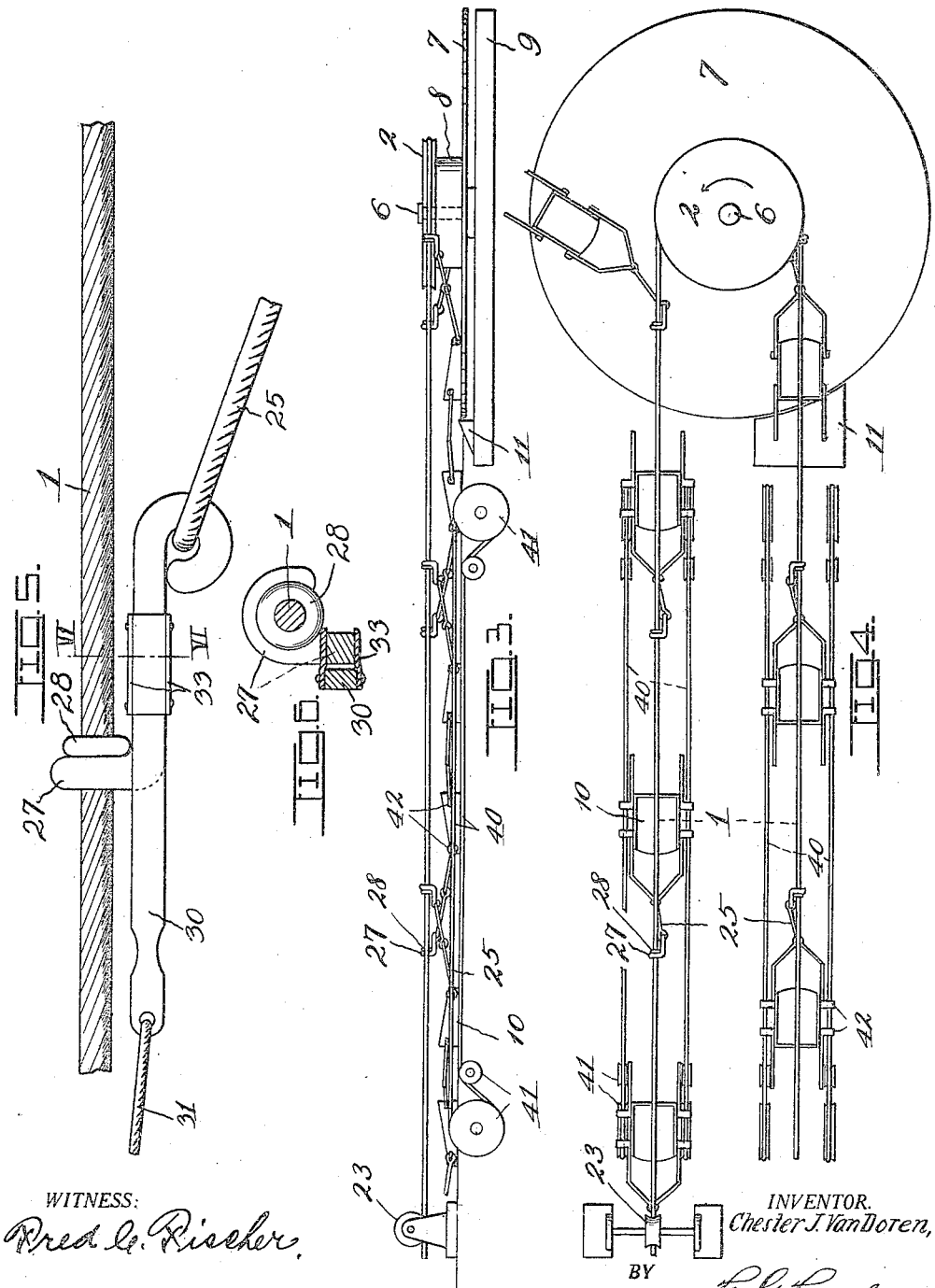

CHESTER J. VAN DOREN, OF KANSAS CITY, MISSOURI.

GRADING AND EXCAVATING APPARATUS.

1,261,980.            Specification of Letters Patent.          Patented Apr. 9, 1918.

Application filed May 7, 1917. Serial No. 167,097.

*To all whom it may concern:*

Be it known that I, CHESTER J. VAN DOREN, a citizen of the United States, residing at Kansas City, in the county of Jackson and State of Missouri, have invented certain new and useful Improvements in Grading and Excavating Apparatus, of which the following is a specification.

My invention relates to grading and excavating apparatus, and objects of the invention are to provide an apparatus of this character which may be employed to advantage in building railroads or other roads; in excavating for basements for buildings, etc.; which is inexpensive to manufacture; and easy to transport and set up for operation.

A further object is to provide apparatus of this character in which a minimum of driving power and manual labor is required in its operation.

Other objects of the invention will hereinafter appear, and in order that said invention may be fully understood, reference will now be made to the accompanying drawings, in which:

Figure 1 is a side elevation of that portion of the apparatus embodying the driving power.

Fig. 2 is a plan view of the parts disclosed by Fig. 1.

Fig. 3 is a continuation of Fig. 1.

Fig. 4 is a continuation of Fig. 2.

Fig. 5 is an enlarged side elevation of a hook and associated parts employed in carrying out the invention.

Fig. 6 is a cross section on line VI—VI of Fig. 5, with some of the parts removed.

In carrying out the invention, I employ a main cable 1, adapted to extend over the ground to be operated upon, and the ends of which are, preferably, connected together, so that said cable can run continuously in one direction while the apparatus is in operation.

2 designates a sheave, and 3 a pair of drums spaced a considerable distance from said sheave and around which the main cable 1 is adapted to operate. One of the drums is driven by gear wheels 4 and 5, the latter of which may be driven by a suitable motor (not shown).

The sheave 2 is mounted upon a vertical shaft 6 and connected to a turn-table 7 through the intermediacy of a spacing sleeve 8, which is also mounted upon the shaft 6. Said shaft 6 is supported upon a suitable frame 9, which is, preferably, placed in a shallow pit in order to locate the upper surface of the turn-table 7 on a level with the ground, so that the bottom of the grading implements 10, can readily pass upon and off of said turn-table while the apparatus is in operation. An incline approach 11 is provided for the oncoming implements 10 to obviate any possibility of their striking against the edge of the turn-table and thus possibly damaging the apparatus. As the empty scrapers 10 pass upon the turntable 7, it coacts with the main cable 1 in carrying said scrapers around the sheave 2 and the sleeve 8 without damage to any of the contacting parts.

In its passage to and from the drums 3, the main cable 1 runs around idlers 15, 16, and 17. The idlers 15 and 17 are mounted at the upper ends of independently adjustable masts 18, having ball-and-sockets 19, supported on the framework 21 carrying the drums 3. Said masts 18 are supported in upright or any of their adjusted positions by guys 22.

One or more depression sheaves 23 are interposed between the drums 3 and the turntable 7, so that the grading implements passing from said turn-table will be forced downwardly into loose dirt and stones to be removed.

Various kinds of grading implements, such as plows, scrapers, etc., may be used. In the drawings, I have shown drag scrapers 10, the bails of which are provided with draft lines 25. The forward end of each draft line 25 is provided with a hook 27, adapted to hook over either side of the main cable 1 and be engaged by any of the abutments 28, fixed at intervals to said main cable.

In order that each hook 27 can be readily released from the engaging abutment 28 and the main cable 1, I provide a trip lever 30 provided at its forward end with a cable 31 and at its rear end with a pair of resilient clamping jaws 33, adapted to be slipped into engagement with any of the hooks 27.

In order that the drag scrapers 10 may operate with the least friction and strain upon the apparatus, I provide carrying cables 40, running over idlers 41 and adapted to engage lugs 42 with which each scraper 10 is provided. If desired, the set of idlers 41 adjacent the drums 3 can be driven therefrom, to insure their traveling with the scrapers. However, the scrapers can be operated at an expenditure of but little power even if the carrying cables 40 remain stationary, as friction due to the lugs running over said cables is much less than if the scrapers were permitted to drag upon the ground.

When dirt and other material is to be dumped over an embankment, such as A, Fig. 1, an operator stands between the two sides of the main cable 1 at a point adjacent said embankment, and clamps the lever 30 over the hook 27 of the initial loaded scraper 10, as it approaches the embankment. Then after said scraper has been dumped at the embankment the operator releases its respective hook 27 from the outgoing side of the main cable 1, by an upward pull upon the cable 31. The lever 30 is then released from the hook 27, which is applied to the returning side of the main cable 1, so that the empty scraper will be carried back for another load. The foregoing operation is carried out with each succeeding scraper. Thus it will be understood that the only work performed by the operator is to dump each scraper, and release each hook 27 from the outgoing side of the main cable 1 and apply it to the returning side of said main cable.

In first starting to build up the enbankment A, the masts 18 are tipped either forward or backward to lower the idlers 15 and 17 and that portion of the main cable 1 passing over said idlers, so that it will not tend to lift the scrapers from the ground. As the embankment increases in height, the masts 18 are adjusted toward a vertical position from time to time to maintain both sides of the cable 1 in substantially a parallel relation to the embankment. If it is desired to widen the embankment, the masts 18 are tipped laterally in opposite directions to spread the two sides of the main cable 1 apart.

From the foregoing description it is obvious that I have provided an apparatus requiring but a minimum amount of manual labor and driving power, and which is well adapted for the purpose intended, and while I have shown and described the preferred form of my invention, I reserve the right to make such changes in the construction, proportion, and arrangement of parts as properly fall within the spirit and scope of the claims.

Having thus described my invention, what I claim and desire to secure by Letters Patent, is:

1. In an apparatus of the character described, a suitable driving power, an endless main cable actuated by said driving power and adapted to extend over the ground to be operated upon, means located a suitable distance from the driving power and around which said main cable travels, a suitable grading implement detachably-connected to the main cable and adapted to be drawn in opposite directions thereby, and endless cables on each of the respective sides of the main cable and upon which said grading implement travels.

2. In a device of the type set forth, an endless main cable, means to drive same, a grading implement, means to connect said implement to the main cable, forward and rearwardly laterally extending lugs on the outer sides of the implement, and a pair of endless cables arranged on the respective sides of the main cable and each having an upper course upon which said lugs engage.

3. In a device of the type set forth, an endless main cable, means to drive same, a grading implement, abutments on the main cable, a hook engageable over the cable and with said abutment, means to connect the hook to the implement, a pair of horizontally disposed spaced resilient clamping jaws secured to the hook, and a lever having one end removably held in the space between said jaws and having its opposite end extending beyond the hook so as to be raised and therewith raise the hook up out of engagement with the cable.

4. In combination with an endless cable, means to drive same, an abutment on the cable, a grading implement, a hook connected to said implement for engagement with the cable and abutment, a member for raising the hook up out of engagement with the cable and abutment, and means to connect the member to the hook to cause the member when moved in one direction to move the hook out of engagement with the cable, and when moved in a second direction to allow of instantaneous disengagement of the member from the hook.

5. In combination with an endless cable, means to drive same, an abutment on the cable, a grading implement, a hook connected to said implement for engagement with the cable and abutment, a member for raising the hook up out of engagement with the cable and abutment, and spring jaws secured at one end to the hook and engaging upper and lower parts of said member to allow the member to lift the hook by raising one end of the member, said jaws being arranged to allow the member to be disengaged therefrom and engaged therewith by merely moving the member horizontally away from the opposite ends of the jaws.

In testimony whereof I affix my signature, in the presence of two witnesses.

CHESTER J. VAN DOREN.

Witnesses:
F. G. FISCHER,
L. J. FISCHER.

Copies of this patent may be obtained for five cents each, by addressing the "Commissioner of Patents, Washington, D. C."